May 10, 1938. L. W. CROSS 2,116,668
REINFORCEMENT FOR PLASTIC MATERIAL
Filed Sept. 24, 1936
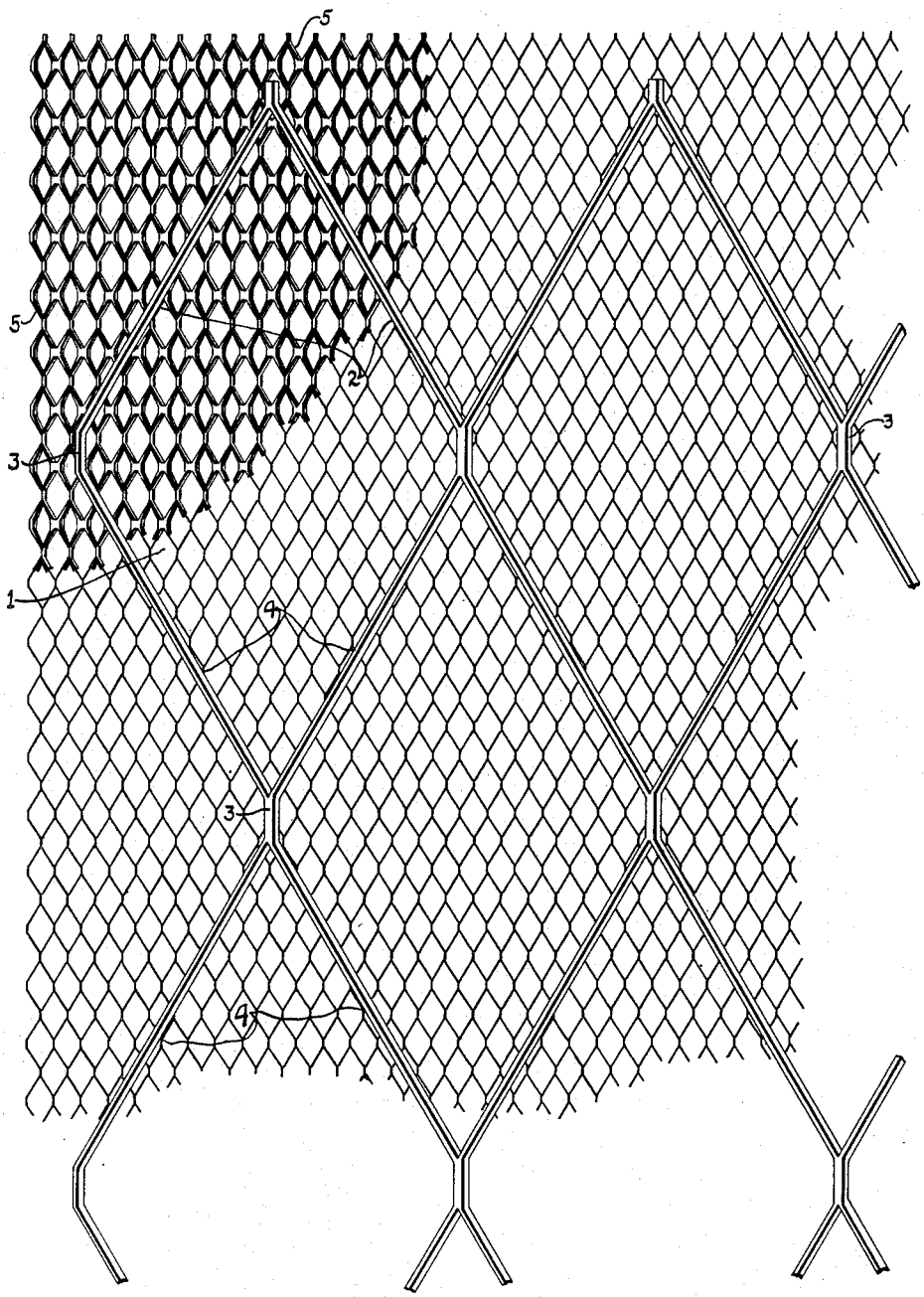
INVENTOR.
Leonard W. Cross
BY
Synnestvedt & Lechner
ATTORNEYS.

Patented May 10, 1938

2,116,668

UNITED STATES PATENT OFFICE 2,116,668

REINFORCEMENT FOR PLASTIC MATERIAL

Leonard W. Cross, Wheeling, W. Va., assignor to The Consolidated Expanded Metal Companies, Wheeling, W. Va., a corporation of West Virginia Application September 24, 1936, Serial No. 102,316

6 Claims. (Cl. 72—117)

This invention relates to a base or reinforcement for plastic material and is especially concerned with reinforcement of this nature made up of reticulated metal, such as expanded metal fabric. The invention, moreover, is especially concerned with a reticulated metal base for plastic material, which base is of the reinforced type, i. e., is composed of a reinforced meshwork sheet.

The reinforcing material of this invention is particularly suitable for use in reinforcing floors or ceilings made up of plastic material such as concrete or the like, although it will be understood that the improved reinforcement is also suitable for use as lathing for plaster.

One of the primary objects of the invention is the provision of reinforcing material which, although of relatively light weight, is at the same time of unusually high strength and rigidity.

The invention further has in view an improved material which is simple to manufacture and relatively inexpensive.

A further object of the invention is the provision of a base comprising a meshwork sheet and reinforcing elements for said sheet, in which the reinforcing elements are terminated short of the margins or edges of the sheet, so that in positioning the sheets in a floor or wall, the overlap joints are not bulky, as has been the case with a number of prior types of reinforced meshwork.

A further object of the improved material resides in the fact that at one side thereof the material is entirely smooth, the reinforcing elements being preferably positioned only at one face. Thus when applying the concrete or other plastic material, the workman's tools will not encounter obstructions which might cause irregular application of the plastic material.

How the foregoing objects and advantages, together with others which will occur to those skilled in the art are attained, will be clear from the following description referring to the figure of the accompanying drawing which illustrates the preferred embodiment.

The improved base or reinforcement is comprised chiefly of two sheets of material, one of which takes the form of a relatively small mesh fabric sheet, and the other a relatively large mesh fabric sheet.

Although other types of reticulated metal or meshwork may be employed, I prefer to use "Diamond" lath as the small mesh sheet. This lath is indicated in the figure of the drawing by the reference numeral 1, and may conveniently be produced by any of the well known machines and processes by which sheet metal is slitted and then opened by bending the strands with respect to the strand interconnecting bridges or bonds. This type of mesh is of advantage since it may readily be made of relatively light gauge sheet metal stock, and the use of light gauge stock is preferable when making up reinforced material of the type herein contemplated. Additionally, the "Diamond" type of mesh provides an effective key for the plastic material applied thereto, and also has a relatively smooth surface which is convenient in making application of the plastic material.

The reinforcing means for the base may take the form of a network or sheet of interconnected reinforcing elements forming relatively large meshes. For this purpose I prefer to employ material made on the guillotine type of machine, i. e., material of the "Golding" fabric type, made with very large size diamond meshes, as is clearly illustrated in the figure of the drawing. Referring specifically to the drawing, the strands of the "Golding" fabric are indicated by the reference numeral 2, and the strand interconnecting bonds by the numeral 3. The drawing clearly shows the difference in size of the meshes of the two fabric sheets. By way of further illustration, I prefer to employ "Diamond" lathing the meshes of which are preferably smaller than about 1 to 1½ inches in length, for example about ½ inch; and "Golding" fabric, the meshes of which are preferably as large as about 6 to 12 inches in length. It will be understood, however, that considerable leeway is here permissible without departing from the spirit of the invention.

The two meshwork sheets are secured together, in the preferred form, by welding at a multiplicity of spaced points, indicated in the drawing at 4. This spaced type of welding is of advantage in avoiding weakening of the small mesh material which might otherwise occur were the welding effected continuously along the length of the reinforcement elements.

The reinforcement may be made up, if desired, of a number of pieces of "Golding" fabric, although I prefer to employ a single sheet of "Golding" fabric, which sheet is slightly smaller in length and width than the "Diamond" lathing to which it is applied. The reinforcement sheet is secured to the lathing sheet centrally thereof so as to leave a non-reinforced margin around the entire periphery of the sheet. Such a margin is designated by the numeral 5, and appears at the upper and left edges of the sheet shown in the figure of the drawing, the other two edges being broken away, since the figure does not illustrate a full sheet. Considered in its entirety, therefore, my improved base has a marginal strip which is thinner than the central region of the sheet. When making application of the material to a floor, wall or ceiling, the joints are preferably lapped a distance approximating the width of the marginal strip and, in spite of the overlap, the thickness of the joint is no greater than any other portion of a sheet.

There is another point which should be noted in connection with the relative position of the two sheets as follows: as shown in the drawing, the major axes of the diamonds of the lathing and of the reinforcement sheet are positioned in parallel relation. Since the major axes of the meshes of the "Diamond" type of lathing ordinarily extend lengthwise of the sheets, the positioning of the reinforcement sheet as just noted therefore also positions the large meshes so that their major axes extend lengthwise of the lathing sheet as a whole. This is of advantage for the reason that in applying the sheets to joists or other supports, the sheets are positioned with the long dimension thereof extended across the joists, and therefore also with the long dimension of the reinforcement diamonds extended across the joists. Greater rigidity is provided by the reinforcement sheet when positioned in this way, as compared with the rigidity which would result were the reinforcement diamonds positioned with their major axes paralleling the joists.

In accordance with the foregoing, especially when employing "Diamond" mesh lathing and "Golding" fabric for the reinforcement, a base is provided having an unusually high degree of rigidity, which rigidity is given to the sheet by reinforcing elements extended diagonally thereof in both directions, so that regardless of the position in which the sheet is applied to joists, studs or other similar support elements, there will be no appreciable sagging between the points of support.

The material may also be made at relatively low cost, of relatively light total weight, and still have the high degree of rigidity which is desirable in material of this type, it being noted that the gauge or weight of the "Diamond" mesh may be materially reduced because of the presence of the reinforcing mesh.

I claim:

1. A base or reinforcement for plastic material embodying two sheets of metal meshwork positioned face to face and secured to each other in rigid relationship, one sheet having relatively small meshwork openings and being formed of relatively light gauge material and the other sheet having relatively large meshwork openings and having relatively heavy gauge elements defining the mesh-work openings, the heavy gauge elements extending diagonally of the first sheet and serving as a reinforcement for the first sheet.

2. A base or reinforcement for plastic material including a sheet of "Diamond" mesh metal lathing, and a sheet of relatively large mesh "Golding" fabric rigidly secured to one face of said lathing sheet and serving as reinforcement therefor.

3. A base or reinforcement for plastic material including a sheet of "Diamond" mesh metal lathing, and a sheet of relatively large mesh "Golding" fabric welded at at least a plurality of widely distributed points to one face of said lathing sheet and serving as reinforcement therefor.

4. A base or reinforcement for plastic material including a sheet of metallic fabric having relatively small diamond-shaped meshwork openings therein adapted to receive and interlock with plastic material applied to the base, and reinforcing means for said sheet comprising an additional meshwork sheet secured at at least a plurality of widely distributed points to one face of the first sheet and having relatively large meshwork openings therein, the major axes of the diamond meshes of the two fabric sheets being parallel to each other.

5. A base or reinforcement for plastic material embodying two sheets of metal meshwork positioned face to face and secured to each other in rigid relationship, one sheet having relatively small meshwork openings and being formed of relatively light gauge material and the other sheet having relatively large meshwork openings and being formed of relatively heavy gauge material to serve as a reinforcement for the first, the reinforcement sheet being smaller in width and length than the other sheet and being secured to said other sheet substantially centrally thereof to leave an unreinforced margin around the edges of the first sheet.

6. A base or reinforcement for plastic material including a sheet of metallic meshwork having relatively small meshwork openings therein adapted to receive and interlock with plastic material applied to the base, and reinforcing means for said sheet comprising an additional meshwork sheet secured to one face of the first sheet and having relatively large meshwork openings therein, the reinforcing sheet being smaller than the first sheet and being rigidly secured to the first sheet in position to leave an edge thereof not reinforced.

LEONARD W. CROSS.